Aug. 1, 1967  H. B. FAKE  3,333,558
MACHINE FOR INSERTING IMITATION MOCCASIN SEAM
Filed Feb. 1, 1963  2 Sheets-Sheet 1

Inventor:
Harry B. Fake
By his Attorney
Edward W. Fearing

Aug. 1, 1967    H. B. FAKE    3,333,558
MACHINE FOR INSERTING IMITATION MOCCASIN SEAM
Filed Feb. 1, 1963    2 Sheets-Sheet 2

United States Patent Office 3,333,558
Patented Aug. 1, 1967

3,333,558
MACHINE FOR INSERTING IMITATION MOCCASIN SEAM
Harry B. Fake, Weymouth, Mass., assignor to United Shoe Machinery Corporation, Boston, Mass., a corporation of New Jersey
Filed Feb. 1, 1963, Ser. No. 255,634
2 Claims. (Cl. 112—38)

The present invention relates to ornamental moccasin type seams and to machines for inserting such seams, more particularly the invention is embodied in improvements in a machine for inserting it, a similar machine being disclosed in United States Letters Patent No. 3,081,-719, granted Mar. 19, 1963, in the name of the present inventor.

The seam inserted by the machine of the prior patent is a moccasin-type two-thread lock stitch seam, the threads of which are exposed on the grain or outer surface of a shoe upper but which are concealed at the flesh or inner surface of the upper with a form of blind stitch.

The objects of the present invention are to provide an improved form of machine for inserting a moccasin-type seam, whereby an entirely different appearance and an ornamental effect, readily distinguishable from those of the prior seam are produced, particularly for the shoe upper or other leather and similar articles utilized in manufacturing upholstery and bags susceptible to effective decoration.

As hereinafter illustrated, a two-thread lock stitch moccasin-type seam is formed with one thread entering and emerging twice in each stitch from a work piece with parallel portions exposed at one side of the work piece to form a shallow trough across which the parallel portions of the thread are stretched tightly, and with the other thread passing through the bights of the exposed loops at the opposite side of the work piece without intersecting the work piece, the sole function of the second mentioned thread being to prevent withdrawal of the loops of the first thread from the work piece. When such seam is formed in a shoe upper with the parallel thread portions exposed at the outer surface of an upper an unusual appearance is created while the exposed thread is somewhat protected from damage or displacement within the trough formed by the seam.

It is highly desirable to have the seam of the present invention inserted with its exposed parallel threads in uniformly spaced relation and the trough within which they are exposed formed with smooth curves, so that no distortion of the upper material will be apparent. To these ends the machine is provided with a work support having work engaging surfaces forming an internal angle within which a work piece is clamped by an angular presser, the external angle of which is substantially smaller than that between the work engaging surfaces of the work support and a needle receiving notch traversing the angle of the presser at a depth greater than the thickness of the needle to enable an adequate length of the thread to be exposed within the trough and to be stretched when the work piece is straightened out. To prevent the work piece from being displaced during penetration of the needle and tightening of each stitch formed by the needle the work support is provided with a pair of abutments, one at either side of the apex on the angularly disposed surfaces on the presser.

These and other features of the invention, as hereinafter described and claimed, will be apparent to those skilled in the art from the following detailed specification, taken in connection with the accompanying drawings, in which:

Figure 1:
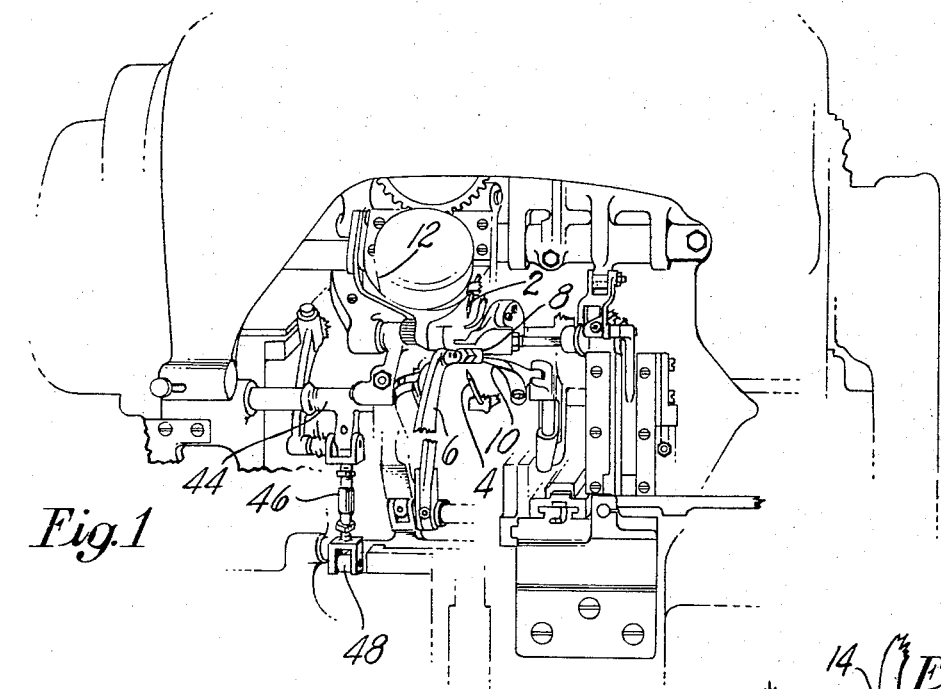
FIG. 1 is a view in front elevation showing an upper portion of a curved hook needle lock stitch sewing machine embodying the features of the present invention.

The illustrated machine is generally similar to that of inventor's prior patent above identified and has a curved hook needle 2, a curved work feeding awl 4, a horn 6 having a presser 8 secured thereto, a two-part work support 10 provided with an attaching bracket, and a rotary hook 12 for carrying loops of needle thread 14 about a locking thread 16. The awl is actuated from beneath the work to form a perforation for the needle acting from above the work to follow the awl as it withdraws from the work. When the awl withdraws from the work it is back fed the length of a stitch and again penetrates the work. Thereafter, the awl and work move in the direction of feed together to a position with the awl perforation in line with the needle ready for its next work penetrating stroke.

In the machine of inventor's prior patent a blind stitch seam is inserted in a shoe upper, the threads of which are exposed on the upper at the outside surface only. The seam of the patent machine is so arranged that ornamentation is accomplished by forming a moccasin-type seam having exposed threads at one side and shallow bridges running parallel the length of the seam between the threads, with enlargements along the line of the seam formed by interengaging portions of the threads providing bulges beneath the bridges. While such seam creates an enhanced effect not obtainable in prior seams, it has been found possible by modifying the construction of the prior machine to obtain a decorative seam, particularly adapted for use in a shoe upper or similar applications with an appearance differing substantially from the one inserted by the prior machine.

Figure 3:
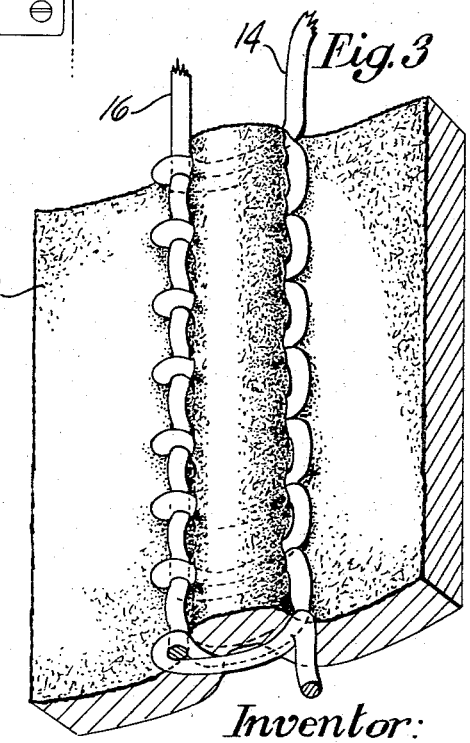
FIG. 3 is a detail perspective view of a portion of a seam formed by the machine of FIG. 1 in a shoe upper at the inside of the upper where it is normally hidden.
Figure 6:
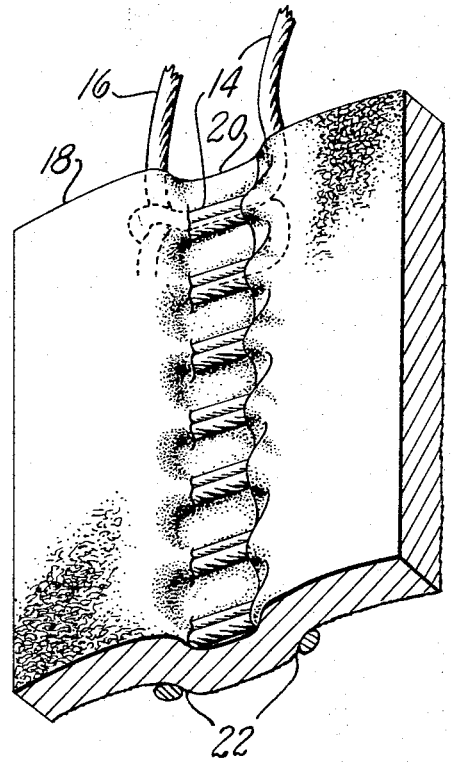
FIG. 6 is a perspective detail view of a portion of the seam in an upper looking at its outside surface.
Figure 5:
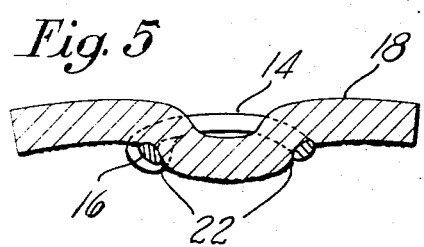
FIG. 5 is a sectional view taken across the length of a seam inserted by the machine.

The seam inserted by the illustrated machine is shown in FIG. 6 and comprises a portion of the outside or grain surface of a shoe upper 18. The needle thread 14 enters into and emerges from a single work piece twice in each stitch with parallel portions exposed on the outside surface to form a shallow trough 20 across which the parallel portions of the thread 6 are stretched. The locking thread 16 passes through the bights of loops in the needle thread 14, as shown in FIG. 3, which loops are exposed on the inside surface of the upper to prevent withdrawal of the loops in the needle thread 14. The parallel portions of the needle thread are of such length for each stitch that they enter and emerge through the upper twice at proper locations to form the shape of the trough 20. The needle thread is therefore stretched tightly when the upper is tensioned. By reason of the tension in the parallel portions of the needle thread, the sides of the trough are scalloped between each pair of adjacent parallel thread portions (FIG. 6) to enhance the ornamental effect.

To enable the needle thread to enter into and emerge from the upper twice in each stitch at opposite edges of the trough 20 the presser 8 has needle and awl receiving notches 21 (FIG. 4) traversing the angle of the presser at a depth greater than the thickness of either the needle or the awl. By so doing adequate space is provided to expose the parallel portions of the needle thread.

The seam produced by the present machine not only produces a pleasing ornamentation but also affords ample protection for the parallel thread portions by reason of their exposure in the trough 20 at the outside surface of a shoe. Even though the shoe is brushed vigorously for removal of dust and polishing the parallel thread portions are sufficiently depressed within the trough below the remainder of the outside surface of the shoe that little difficulty from abrasion occurs. Also, at the inside surface of the shoe the trough forms shoulders 22 which relieve the portions of threads 14 and 16 inside the shoe from excessive pressure during wear of the shoe.

The machine for inserting the seam during its operation forms the work piece 18 into an angular bend 24 (see FIG. 2) corresponding to the angle formed by work engaging surfaces 25 and 26 on the presser 8 and 27 and 28 on the work support, which consists of the bracket 10 and a block 30. The work supporting surfaces 27 and 28 are displaced by an angle of about 95° and the work engaging surfaces 25 and 26 of the presser, are separated by an angle of about 85°, leaving a difference of about 5° between the work engaging surfaces of the work support and presser. In this way the greatest pressure is exerted at the apexes of the angles on the work support and presser, thus gripping the bend 24 in the work piece material more securely than any other portion of the work piece along the line of the seam. The advantage of such a clamping action is that the bend 24 provides an easy turning center about which the work piece may be moved as it is being fed during sewing, so that a smooth curve may be provided in the seam when required.

During penetration of the work piece by the awl and the needle and while each stitch is being tightened to set each stitch securely in place it is highly desirable to prevent any possible movement in the work piece, especially along the clamping area at the bend 24. To avoid displacement of the bend under these conditions the work support is formed with a pair of abutments 32 and 34 between which is a groove 36 for receiving the bend during sewing. By reason of the abutments 32 and 34 any attempt to move the work piece vertically along the bend 24 is resisted rigidly, such displacement tending to force the presser 8 more tightly against the work piece.

Figure 2:
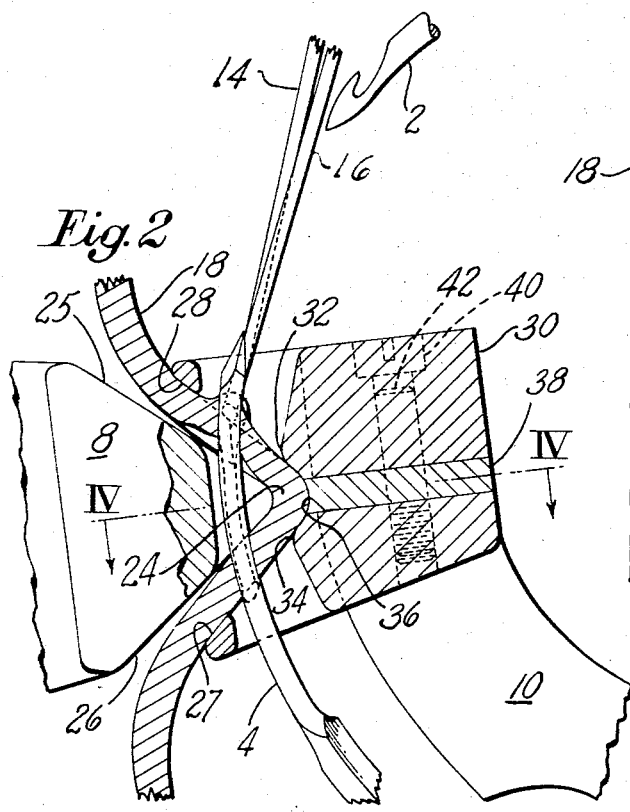
FIG. 2 is an enlarged sectional view of the machine, showing a work support and presser together with certain other stitch forming devices during operation on a work piece, as seen from the line II—II of FIG. 4.
Figure 4:
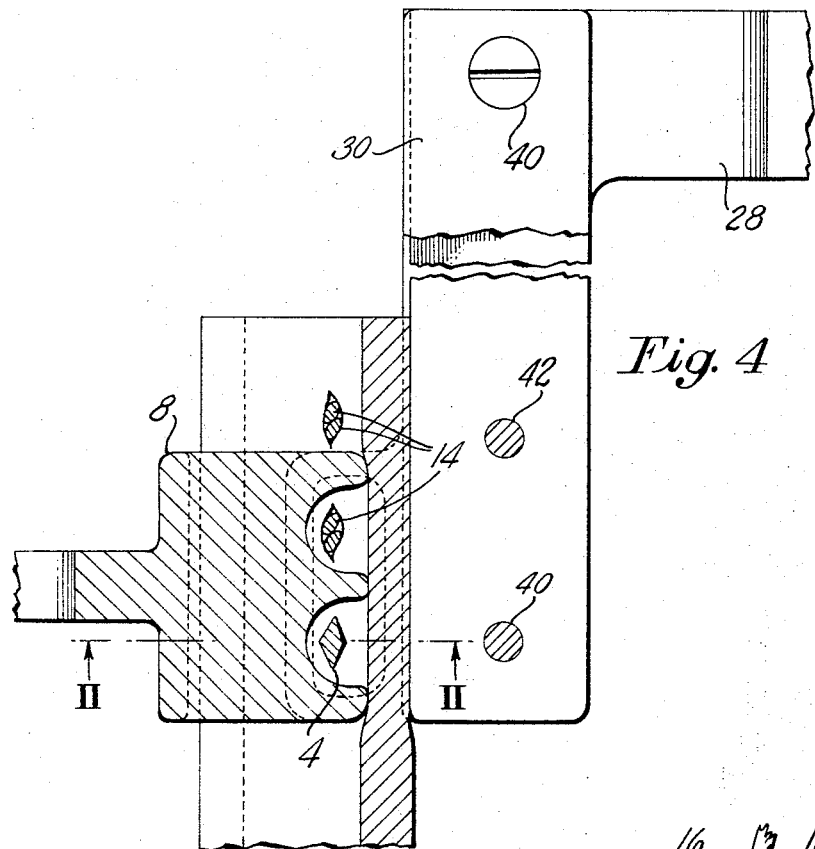
FIG. 4 is a sectional plan view of the parts shown in FIG. 2, as seen from the line IV—IV of that figure.

To simplify the formation of the groove 36 the two parts 10 and 30 of the work support have disposed between them a spacing plate 38, the forward work engaging edge of which is concave with the exact curvature assumed by the bend in the work piece, the spacing plate and the parts 10 and 30 being secured together by means of screws 40 and dowel pins 42, as shown in FIGS. 2 and 4.

To insure that an adequate length of thread 16 will be provided for the parallel portions exposed in the trough 20 the machine of FIG. 1 is equipped with a thread measuring mechanism including an arm 44, a longitudinally adjustable link 46 connecting the arm 44 with a second arm 48 acting to vary the amount of thread rendered available for each stitch according to the thickness of the work. This mechanism is the same as that disclosed in United States Letters Patent No. 1,169,909, granted Feb. 1, 1916, on application of Fred Ashworth, to which reference may be had for a more complete understanding. By adjusting the thread measuring mechanism practically to the limit of its maximum measuring adjustment adequate supply of thread will be provided in each stitch to span the width of the trough 20 in the work piece, so that proper tightening action in each stitch will be obtained when the work piece is straightened out after completing the sewing operation. Such tightening action is essential especially in the case of a shoe upper with the ornamental seam inserted by the present machine. During a subsequent lasting operation of the upper, the upper is tensioned to give it the requisite shape and the tensioning action draws the threads into stable positions where they embed themselves somewhat into the material of the upper, thus avoiding likelihood of displacement after construction of the shoe is completed.

The nature and scope of the invention having been indicated and a particular embodiment having been described, what is claimed is:

1. A machine for inserting a two-thread lock stitch moccasin-type seam, one thread of which enters and emerges twice in each stitch from both sides of a single piece of material, said machine having stitch forming devices including a needle, a work support provided with work engaging surfaces disposed with relation to each other and extending in the direction of work feed to form an internal angle, an internal presser having a tip with work engaging surfaces disposed at an external angle substantially less than that between the work engaging surfaces of the work support and a needle receiving notch traversing the angle of the presser with a depth greater than the thickness of the needle to enable adequate exposure of the thread within the trough of the work piece, in combination with a pair of abutments on the work support in the plane of the needle, one at either side of the apex on the presser to support the work piece against displacement during penetration by the needle and tightening of each stitch.

2. A machine for inserting a two-thread lock stitch moccasin-type seam, one thread of which enters and emerges twice in each stitch from both sides of a single piece of material, said machine having stitch forming devices including a needle, a work support provided with work engaging surfaces disposed with relation to each other and extending in the direction of work feed to form an angle, an internal presser having a tip with work engaging surfaces disposed at an angle substantially less than that between the work engaging surfaces of the work support and a needle receiving notch traversing the angle of the presser with a depth greater than the thickness of the needle to enable adequate exposure of the thread within the trough of the work piece, in combination with a pair of abutments on the work support in the plane of the needle, one at either side of the apex of the presser to support the work piece against displacement during penetration by the needle and tightening of each stitch, and mechanism for measuring a supply of thread for each stitch to span the width of the trough in the work piece.

References Cited

UNITED STATES PATENTS

| | | | |
|---|---|---|---|
| 1,169,909 | 2/1916 | Ashworth | 112—38 |
| 2,399,159 | 4/1946 | Ashworth | 112—62 |
| 2,415,401 | 2/1947 | Ashworth | 112—62 |
| 2,487,918 | 11/1949 | Ashworth | 112—62 |
| 2,632,415 | 3/1953 | Newhall | 112—62 |
| 2,818,040 | 12/1957 | Krohn | 112—262 |
| 2,906,224 | 9/1959 | Henry | 112—262 |
| 3,056,363 | 10/1962 | Bergeron | 112—62 |
| 3,081,719 | 3/1963 | Fake | 112—62 X |

PATRICK D. LAWSON, *Primary Examiner.*

DAVID J. WILLIAMOWSKY, *Examiner.*